United States Patent [19]

Reeder et al.

[11] 4,442,524

[45] Apr. 10, 1984

[54] MULTIPLE LEVER APPARATUS FOR POSITIONING AN OPTICAL ELEMENT

[75] Inventors: Dennis J. Reeder, Cupertino, Calif.; John S. Campbell, Indianapolis, Ind.; Keith J. Kasunic, Los Altos Hills; Lee H. Laiterman, Santa Clara, both of Calif.

[73] Assignee: Spectra-Physics, Inc., San Jose, Calif.

[21] Appl. No.: 384,459

[22] Filed: Jun. 3, 1982

[51] Int. Cl.³ ............................................. H01S 3/08
[52] U.S. Cl. ................................... 372/107; 372/108; 350/288; 350/319
[58] Field of Search ................ 350/319, 288; 372/103, 372/99, 107, 108

[56] References Cited

U.S. PATENT DOCUMENTS

| 3,478,608 | 11/1969 | Met | 372/107 |
| 3,700,313 | 10/1972 | Karr et al. | 372/107 |
| 3,814,507 | 6/1974 | Osborn et al. | 372/107 |
| 3,865,472 | 2/1975 | Hobart et al. | 350/288 |
| 3,883,820 | 5/1975 | Burns et al. | 372/107 |
| 3,886,474 | 5/1975 | Hensolt et al. | 372/107 |
| 3,897,139 | 7/1975 | Caruolo et al. | 350/288 |
| 3,953,113 | 4/1976 | Shull | 372/107 |
| 4,298,248 | 11/1981 | Lapp | 350/288 |

*Primary Examiner*—William L. Sikes
*Assistant Examiner*—Léon Scott, Jr.
*Attorney, Agent, or Firm*—Donald C. Feix

[57] ABSTRACT

A four-bar alignment adjustment mechanism with elastic hinges enables the mirrors of a gas laser to be very finely tuned with accuracy. A 50° rotation of the fine-adjust knob deflects the mechanism to produce a 1% drop in power from maximum. The system has little backlash and does not use an extra-fine screw to directly move the mirror plate.

7 Claims, 3 Drawing Figures

MULTIPLE LEVER APPARATUS FOR POSITIONING AN OPTICAL ELEMENT

BACKGROUND OF THE INVENTION

The invention relates generally to gas lasers, and more particularly to a fine-adjust mechanism or micropositioner for the mirrors of such a laser, enabling extremely fine adjustments with little backlash.

An essential component of a laser is an optical cavity consisting of two opposing mirrors on either end of the laser. These mirrors cause light emitted from an excited gas to resonate between them. To establish maximum power output, the mirrors must be in precise angular alignment, on the order of ten microradians. Unfortunately, the tolerances associated with the manufacture of the optical cavity do not permit such a precise assembly to be set during manufacture. As a result, it is necessary to provide the user with a fine-tuning device which positions one of the mirrors to the designed alignment. This invention is directed to an improved fine-tuning device.

A typical micropositioner which has been in current use had the mirror to be aligned mounted on a plate at the end of the optical cavity. The plate was spring loaded, bearing against three thermally stable quartz rods which minimized changes in alignment due to variations in ambient temperature.

The necessary angular alignment of the mirror was obtained by turning a fine-adjustment knob, the rotation of which was geared down by a factor of sixty. The geared-down output acted as an input to an extra-fine screw that converted the rotary motion of the reduction gears to a linear motion which in turn tilted the mirror plate relative to the quartz rods. This resulted in an angular displacement of the mirror about a pivot point, causing a change in laser power output.

There have been two primary problems with this type fine-adjustment systems:

(a) Gear backlash. Backlash in the rotary gear reduction system described has resulted in mirror alignment which is neither resetable nor repeatable.

(b) Screw imperfections. Laser power output was directly coupled to the linear motion of the extra-fine screw used in the above-described design. As a result, any manufacturing imperfections in the screw such as shaft eccentricities or poor surface finish would result in undesirable changes in the output.

SUMMARY OF THE INVENTION

A primary object of this invention is a micro-positioning device which has neither backlash nor the power output irregularities inherent in the manufacture of extra-fine screws.

Associated with the primary object are a number of performance objectives which it is desirable that the device meet.

(a) Resolution. Resolution is the smallest angular deflection necessary to keep the output of a laser within one percent of maximum power. In a one-meter laser of current design, this may be about 12 microradians. Such angular deflection should be effected by a convenient amount of input rotation to a manual knob, preferably a significant fraction of one revolution, such as 50°.

(b) Mechanical creep. Creep is the relaxation of alignment over time. Desirably, creep should be limited to the extent that it does not result in power loss which exceeds one percent of maximum power per week.

(c) Thermal stability. It is desired that angular misalignment due to variations in ambient temperature must not cause a change of more than 0.5% of full power per degree centigrade.

(d) Range of adjustment. The range of adjustment should be at least three degrees from alignment at maximum power.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENTS

Figure 1:
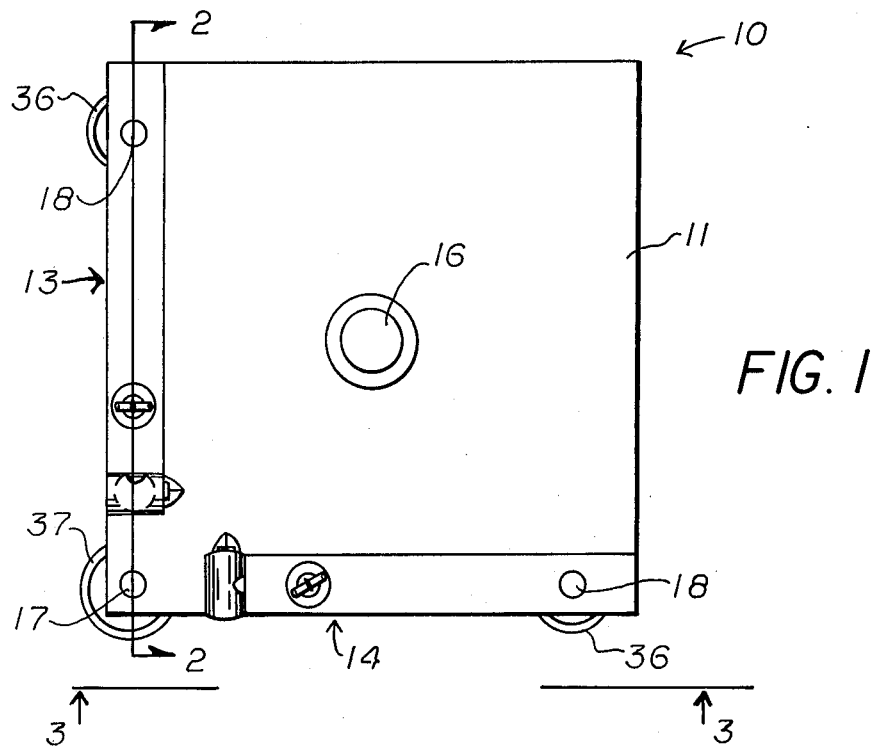
FIG. 1 is an elevation view showing a finely adjustable laser mirror positioner according to the invention as seen from inside the laser optical cavity looking toward one end, with a mirror seen mounted on an angularly adjustable base plate. Two similar fine-adjustment mechanisms are mounted at the side and bottom of the base plate to effect angular adjustment of the mirror about two axes.

FIG. 1 shows a laser mirror adjustment assembly 10 according to the invention, including a mirror base plate 11, to be located at one end of the optical cavity of a laser, and side and bottom fine-adjustment mechanisms generally indicated at 13 and 14. A laser mirror 16 is supported fixedly on the base plate 11. The two mechanisms 13 and 14 can be located at any two adjacent edges of the base plate 11—one side and the bottom, as indicated, or one side and the top. The two mechanisms provide for angular adjustment of the base plate 11 and the mirror 16 about two perpendicular axes, for a full range of angular adjustment.

Figure 2:
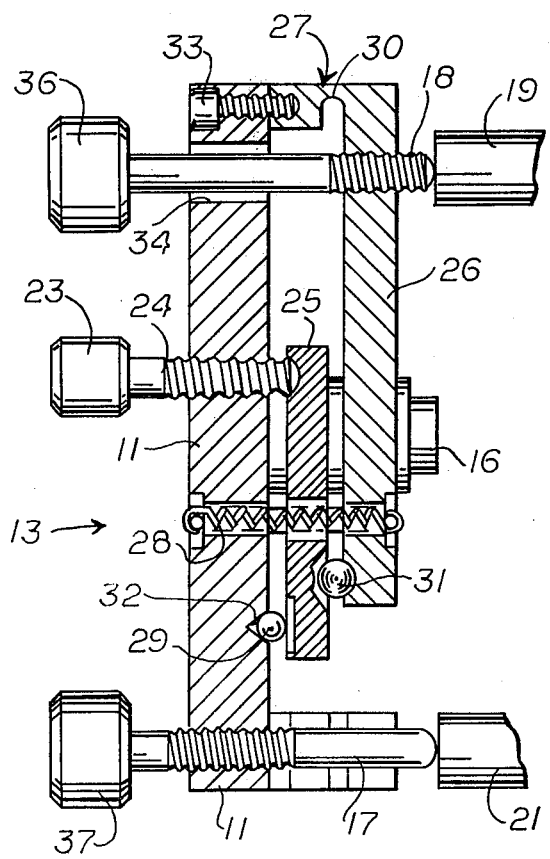
FIG. 2 is a view in section showing this fine-adjustment mechanism, as seen along the line 2—2 in FIG. 1.
Figure 3:
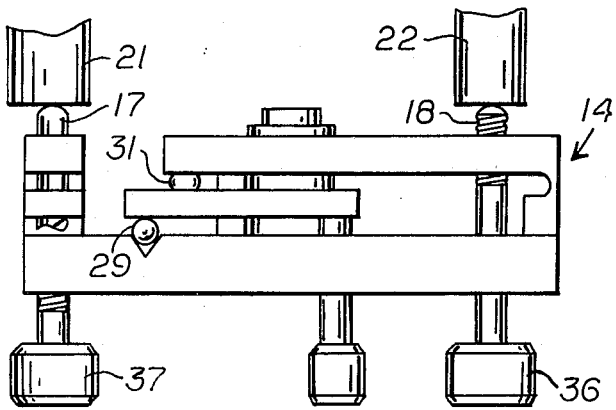
FIG. 3 is a bottom end view of the mechanism, as seen along the line 3—3 in FIG. 1.

As seen in FIGS. 2 and 3, the base plate 11 bears, via a corner pivot rod 17 and rough-adjustment screws 18, against fixed, stable structure in the laser, such as the three quartz rods 19, 21 and 22 shown in FIGS. 2 and 3, not shown in FIG. 1. The quartz rods are thermally stable and minimize alignment changes due to variations in ambient temperature, as was known in the prior art. The two mechanisms 13 and 14 and the base plate 11 are urged toward the quartz rods 19, 21 and 22 by suitable spring means (not shown).

FIG. 2 shows in detail the components of the micropositioner assembly 13, typical of both assemblies 13 and 14. The assembly includes a fine-adjustment knob 23, with an input screw 24, threaded through the base plate 11, an input link 25 acting as a secondary lever, an output link 26 acting as a primary lever, through which the rough-adjustment screw 18 is threaded, a hinge 27 connecting the output link 26 with the upper end of the base plate 11, and an extension spring 28 urging the assembly together. The laser mirror 16 is seen beyond the links 24 and 26, secured to the base plate 11.

Pivoting of the input link or secondary lever 25 is assisted by pivot bearings preferably comprising a pin 29 and a steel ball 31. The pin 29 resides in a notch 32 in the base plate 11 and is borne against by the input link, while the ball 31 acts between the input link 25 and the output link 26, as illustrated.

The hinge 27 preferably comprises a "living hinge" as indicated, being formed integrally with the output link or primary lever 26 and affixed rigidly to the base plate 11, as by a screw fastener 33. The metal of the living hinge bends at an area 30 of reduced material thickness to accomodate the small angular movement between the output link 26 and the base plate 11.

The rough-adjustment screw 18 passes through a large opening 34 in the base plate 11, avoiding contact with the base plate, and has a rough-adjustment knob 36 at its outer end. The corner pivot rod 17, threaded through the base plate 11, has a similar knob 37. Both these knobs 36 and 37 may be used as rough-adjustment knobs for the angularity of the base plate 11 and the mirror 16. The knob 37 and the two knobs 36 (see also the mechanism 14 of FIG. 3) may be used in conjunction with one another to roughly adjust the angularity of the mirror 16 while also fine tuning the axial position of the mirror in the laser cavity.

Fine tuning of the mirror angularity to obtain the desired power output is accomplished by turning the fine-adjustment knob 23. This knob rotates the input screw 24, the linear motion of which displaces the input link 25 as can be envisioned from the drawing. The reduced displacement of the ball bearing 31 is then transmitted to the output link 26, which reduces the motion even further at the hinge 27. The total reduction in displacement, from the initial screw displacement to the "living hinge" 27 may be by a factor on the order of 73. The final angular movement is that of the base plate 11—it rotates slightly about the pivot point formed by the bearing of the corner pivot rod 17 against the quartz rod 21, resulting in the desired change in mirror alignment.

This mechanism has several advantages. First, by avoiding the use of a high-precision screw as a direct means of tilting the mirror plate, the power output is no longer sensitive to any manufacturing imperfections of the screw. Instead, the motion of the screw is reduced by a very large factor, ample margin to isolate power output from the irregularities. Second, by using the lever arrangement with elastic hinges for motion reduction, backlash problems associated with the meshing of teeth in conventional gear systems are avoided.

The described micropositioner mechanism easily meets and exceeds the performance objectives outlined above. Mechanical creep and thermal stability can be far better than the criteria listed. The objectives relative to resolution and adjustment range can be easily met, selected as desired by linkage lengths, spacing between pivot points and spacing between links. The use of the "living hinge" and the positive-positioning pin and ball as hinges help reduce backlash practically to zero.

It should be understood that reference to "base plate" or "mirror base plate" herein and in the appended claims refers not only to a single-component base plate 11 as illustrated, but to forms including multiple components thereof.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. An apparatus for making fine adjustments in the positioning of a mirror in a laser cavity and comprising,
   a mirror base plate to which the mirror is attached,
   a first fine-adjustment mechanism for making an angular adjustment of the base plate and mirror about one axis, said mechanism comprising,
   an input link and an output link arranged generally parallel to one edge of the base plate with each link acting as a lever and first pivot means for imparting great mechanical advantage to motion at one end of the output link as a result of input motion of one end of the input link,
   output link fulcrum means associated with fixed structure of the laser and located near the opposite end of the output link for establishing still greater mechanical advantage through the pivoting of the output link,
   second pivot means connecting one end of the base plate edge to the output link at a point of reduced motion of the output link near said opposite end of the output link,
   base plate fulcrum means associated with fixed structure of the laser and located at the end of the base plate edge opposite said one end and positioned so that said reduced motion of the output link pivots the base plate about the base plate fulcrum means for adjusting the mirror about one axis, and
   an input fine-adjustment screw engaging said one end of the input link and threaded through screw threads associated with the base plate so that rotation of the input fine-adjustment screw effects very fine adjustment of the angular position of the base plate and mirror about said one axis.

2. The invention defined in claim 1 including a second fine-adjustment mechanism arranged along a second edge of the mirror base plate adjacent to and perpendicular to that edge of the base plate having the first fine adjustment mechanism, said base plate fulcrum means serving both mechanisms at the common corner of the base plate so that the base plate and mirror may be adjusted angularly about two perpendicular axes.

3. The invention defined in claim 1 wherein the output link fulcrum means comprise a rough-adjustment screw threaded through the output link and wherein the end of the rough-adjustment screw is a pivot point fulcrum bearing against said fixed structure of the laser.

4. The invention defined in claim 1 wherein said second pivot means comprise a hinge formed by the attachment of the base plate edge and output link in an area of reduced material thickness which permits changes of angular alignment of the base plate edge and the output link.

5. The invention defined in claim 1 wherein the base plate fulcrum means comprise an adjustment screw threaded through screw threads associated with the base plate and bearing against said fixed structure of the laser.

6. The invention defined in claim 1 wherein the input link is positioned between the base plate and the output link and wherein the first pivot means comprise a first pivot bearing between the base plate and an end of the input link and a second pivot bearing between one end of the output link and the input link.

7. The invention defined in claim 6 including a spring urging the output link toward the mirror base plate and also urging the input link to pivot toward the mirror base plate and against the input fine-adjustment screw.

* * * * *